United States Patent
Doshi et al.

(10) Patent No.: US 9,083,729 B1
(45) Date of Patent: Jul. 14, 2015

(54) SYSTEMS AND METHODS FOR DETERMINING THAT UNIFORM RESOURCE LOCATORS ARE MALICIOUS

(71) Applicant: Symantec Corporation, Mountain View, CA (US)

(72) Inventors: Nishant Doshi, Mountain View, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 102 days.

(21) Appl. No.: 13/742,153

(22) Filed: Jan. 15, 2013

(51) Int. Cl.
- H04L 29/06 (2006.01)
- G06F 11/00 (2006.01)
- G06F 12/14 (2006.01)
- G06F 12/16 (2006.01)
- G08B 23/00 (2006.01)

(52) U.S. Cl.
CPC .................................. H04L 63/1408 (2013.01)

(58) Field of Classification Search
None
See application file for complete search history.

(56) References Cited

U.S. PATENT DOCUMENTS

| | | | |
|---|---|---|---|
| 8,150,779 B1 * | 4/2012 | Gauvin | 705/319 |
| 8,244,532 B1 | 8/2012 | Begeja et al. | |
| 2005/0198160 A1 | 9/2005 | Shannon et al. | |
| 2006/0168032 A1 | 7/2006 | Cai et al. | |
| 2009/0158430 A1 | 6/2009 | Borders | |
| 2009/0249451 A1 | 10/2009 | Su et al. | |
| 2010/0114911 A1 | 5/2010 | Al-Kofahi et al. | |
| 2010/0180333 A1 | 7/2010 | Bono et al. | |
| 2011/0191849 A1 * | 8/2011 | Jayaraman et al. | 726/23 |
| 2011/0256889 A1 | 10/2011 | Polis et al. | |
| 2012/0060221 A1 * | 3/2012 | Gerber et al. | 726/25 |
| 2012/0215861 A1 | 8/2012 | Smith et al. | |
| 2013/0073568 A1 | 3/2013 | Federov et al. | |
| 2013/0179421 A1 * | 7/2013 | Jeong et al. | 707/706 |

OTHER PUBLICATIONS

Ilya Sokolov et al.; Systems and Methods for Detecting Illegitimate Messages on Social Networking Platforms; U.S. Appl. No. 13/557,077, filed Jul. 24, 2012.

Sourabh Satish; Systems and Methods for Validating Electronic Message Recipients; U.S. Appl. No. 13/452,734; Filed on Apr. 20, 2012.

(Continued)

*Primary Examiner* — Shin-Hon Chen
(74) *Attorney, Agent, or Firm* — ALG Intellectual Property, LLC (57) ABSTRACT

A computer-implemented method for determining that uniform resource locators are malicious may include identifying a uniform resource locator that may be posted on a social networking platform and that may be subject to a security assessment, gathering contextual data from the social networking platform that describes at least one instance of the uniform resource locator within the social networking platform, generating, based on the contextual data, a social fingerprint of the uniform resource locator and classifying the uniform resource locator as malicious based at least in part on the social fingerprint. Various other methods, systems, and computer-readable media are also disclosed.

20 Claims, 7 Drawing Sheets

(56) References Cited

OTHER PUBLICATIONS

Ilya Soklov; Systems and Methods for Performing Security Analyses of Applications Configured for Cloud-Based Platforms; U.S. Appl. No. 13/439,458; Filed on Apr. 4, 2012.

Ghiossi, Caroline, "Explaining Facebook's Spam Prevention Systems", http://blog.facebook.com/blog.php? post=4032http://blog.facebook.com/blog.php? post=403200567130&fb_comment_id=fbc_403200567130_18440560_10150256 618857131#uvivw0_1, as accessed on Apr. 24, 2012, (Jun. 29, 2010).

* cited by examiner

SYSTEMS AND METHODS FOR DETERMINING THAT UNIFORM RESOURCE LOCATORS ARE MALICIOUS

BACKGROUND

Uniform Resource Locators (URLs) are a common tool for linking together content on the Internet. As social networks become increasingly popular, the number of URLs posted to social networks also increases. Where there is content, there is malicious content, and the number of malicious URLs posted to social networking platforms grows commensurately with their popularity. Users of social networking platforms may be particularly vulnerable to malicious URLs because of the trusted context that social networking platforms can create.

Unfortunately, traditional security systems may have difficulty determining whether a URL posted to a social networking platform may be malicious. Scanning web resources indicated by URLs may be resource intensive and may sometimes yield inaccurate. URL cloaking with link shorteners can make identifying unique URLs difficult. Blacklisting may prevent crawlers from gaining information about potentially malicious URLs. Many unique malicious URLs are posted exclusively to social networking platforms, rendering some traditional techniques that are not adapted for social networking platforms ineffective at identifying and classifying these malicious URLs. Accordingly, the instant disclosure identifies and addresses a need for additional and improved systems and methods for determining that uniform resource locators are malicious.

SUMMARY

As will be described in greater detail below, the instant disclosure generally relates to systems and methods for determining that uniform resource locators are malicious by gathering contextual data from the social networking platform (e.g., data describing and/or produced by social features of the social networking platform), generating a social fingerprint, and classifying the uniform resource locator as malicious based on the social fingerprint.

In one example, a computer-implemented method for determining that uniform resource locators are malicious may include (1) identifying a uniform resource locator that may be posted on a social networking platform and that may be subject to a security assessment, (2) gathering contextual data from the social networking platform that describes at least one instance of the uniform resource locator within the social networking platform, (3) generating, based on the contextual data, a social fingerprint of the uniform resource locator and (4) classifying the uniform resource locator as malicious based at least in part on the social fingerprint.

In some examples, the computer-implemented method may include performing a security action based on the indication that the uniform resource locator may be malicious.

In one embodiment, the computer-implemented method may further include (1) identifying a plurality of uniform resource locators that are posted on a social networking platform and that are subject to a security assessment, (2) gathering a plurality of contextual data from the social networking platform that describes a plurality of instances of the plurality of uniform resource locators within the social networking platform, (3) generating, based on the plurality of contextual data, a plurality of social fingerprints of the plurality of uniform resource locators and (4) generating, based on the plurality of social fingerprints, a social fingerprint classifier, wherein classifying the uniform resource locator as malicious may include using the social fingerprint classifier.

In some examples, gathering the contextual data that describes at least one instance of the uniform resource locator within the social networking platform may include gathering a first set of contextual data that describes a first instance of the uniform resource locator within the social networking platform and gathering a second set of contextual data that describes a second instance of the uniform resource locator within the social networking platform, the second instance of the uniform resource locator including a masked uniform resource locator that redirects to the uniform resource locator.

In one embodiment, the contextual data may include a uniform resource locator masking service used on the uniform resource locator.

In one embodiment, the contextual data may include a social media indicator attached to a post containing the uniform resource locator.

In one embodiment, the contextual data may include a keyword in a post containing the uniform resource locator.

In one embodiment, the contextual data may include a language in a post containing the uniform resource locator.

In one embodiment, the contextual data may include a timestamp of a post containing the uniform resource locator.

In one embodiment, a system for implementing the above-described method may include (1) an identification module programmed to identify a uniform resource locator that may be posted on a social networking platform and that may be subject to a security assessment, (2) a gathering module programmed to gather contextual data from the social networking platform that describes at least one instance of the uniform resource locator within the social networking platform, (3) a generation module programmed to generate, based on the contextual data, a social fingerprint of the uniform resource locator, (4) a classifying module programmed to classify the uniform resource locator as malicious based at least in part on the social fingerprint and (5) at least one processor configured to execute the identification module, the gathering module, the generation module and the classifying module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a uniform resource locator that may be posted on a social networking platform and that may be subject to a security assessment, (2) gather contextual data from the social networking platform that describes at least one instance of the uniform resource locator within the social networking platform, (3) generate, based on the contextual data, a social fingerprint of the uniform resource locator and (4) classify the uniform resource locator as malicious based at least in part on the social fingerprint.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining that uniform resource locators are malicious. As will be explained in greater detail below, classifying uniform resource locators as malicious using contextual data from the social networking platform allows for near real-time classification without being foiled by uniform resource locator cloaking or crawler blacklists.

The following will provide, with reference to FIGS. 1, 2, 4, and 5, detailed descriptions of exemplary systems for determining that uniform resource locators are malicious. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
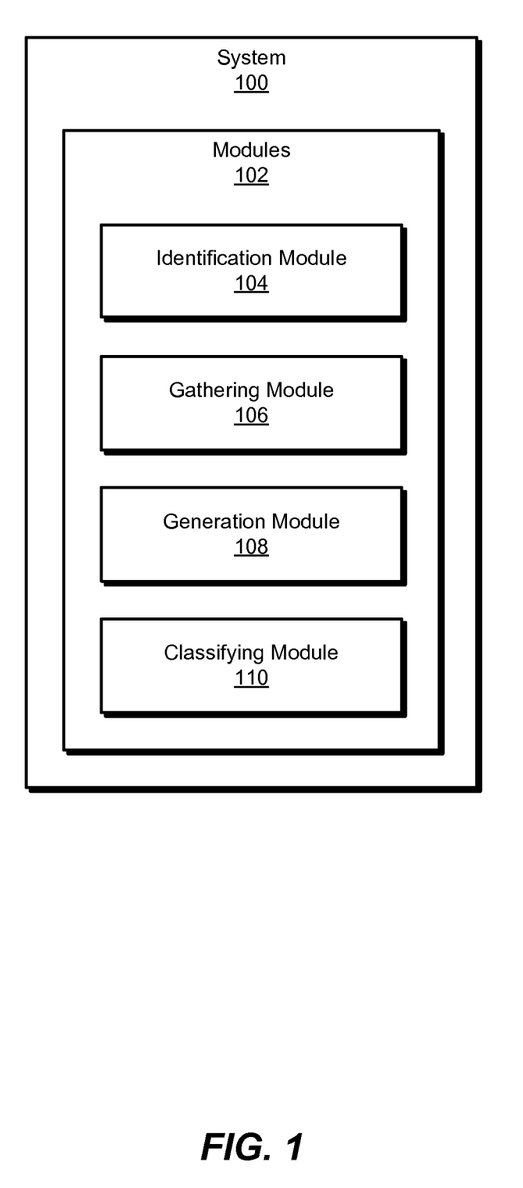
FIG. 1 is a block diagram of an exemplary system for determining that uniform resource locators are malicious.

FIG. 1 is a block diagram of exemplary system 100 for determining that uniform resource locators are malicious. As illustrated in this figure, exemplary system 100 may include one or more modules 102 for performing one or more tasks. For example, and as will be explained in greater detail below, exemplary system 100 may include an identification module 104 programmed to identify a uniform resource locator that is posted on a social networking platform and that is subject to a security assessment. Exemplary system 100 may additionally include a gathering module 106 programmed to gather contextual data from the social networking platform that describes at least one instance of the uniform resource locator within the social networking platform. Exemplary system 100 may also include a generation module 108 programmed to generate, based on the contextual data, a social fingerprint of the uniform resource locator. Exemplary system 100 may additionally include a classifying module 110 programmed to classify the uniform resource locator as malicious based at least in part on the social fingerprint. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
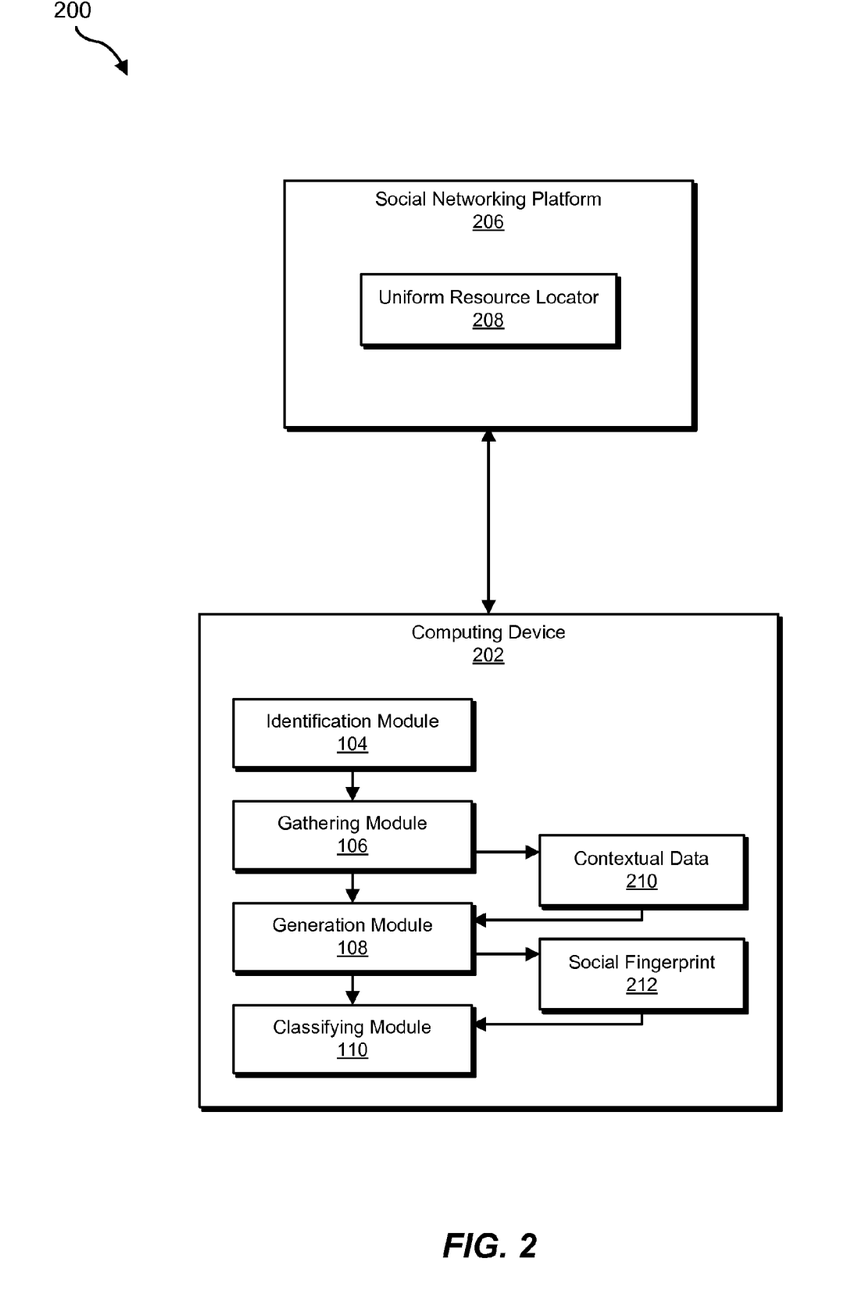
FIG. 2 is a block diagram of an exemplary system for determining that uniform resource locators are malicious.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a social networking platform 206. Computing device 202 may be programmed with one or more of modules 102.

In one embodiment, one or more of modules 102 from FIG. 1 may, when executed by at least one processor of computing device 202, facilitate computing device 202 in determining that uniform resource locators are malicious. For example, and as will be described in greater detail below, one or more of modules 102 may cause computing device 202 to determine that one or more uniform resource locators are malicious. For example, and as will be described in greater detail below, identification module 104 may be programmed to identify a uniform resource locator 208 that is posted on a social networking platform 206 and that is subject to a security assessment. Gathering module 106 may be programmed to gather contextual data 210 from social networking platform 206 that describes at least one instance of uniform resource locator 208 within social networking platform 206. Generation module 108 may be programmed to generate, based on contextual data 210, a social fingerprint 212 of uniform resource locator 208. Classifying module 110 may be programmed to classify uniform resource locator 208 as malicious based at least in part on social fingerprint 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. For example, computing device 202 may represent a security server (e.g., administrated by a social networking service and/or by a third-party security vendor).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. For example, computing device 202 may represent a security server (e.g., administrated by a social networking service and/or by a third-party security vendor).

Social networking platform 206 generally represents any type or form of computing device, computing system, and/or computing service capable of storing, hosting, relaying, and/or displaying one or more uniform resource locators.

Figure 3:
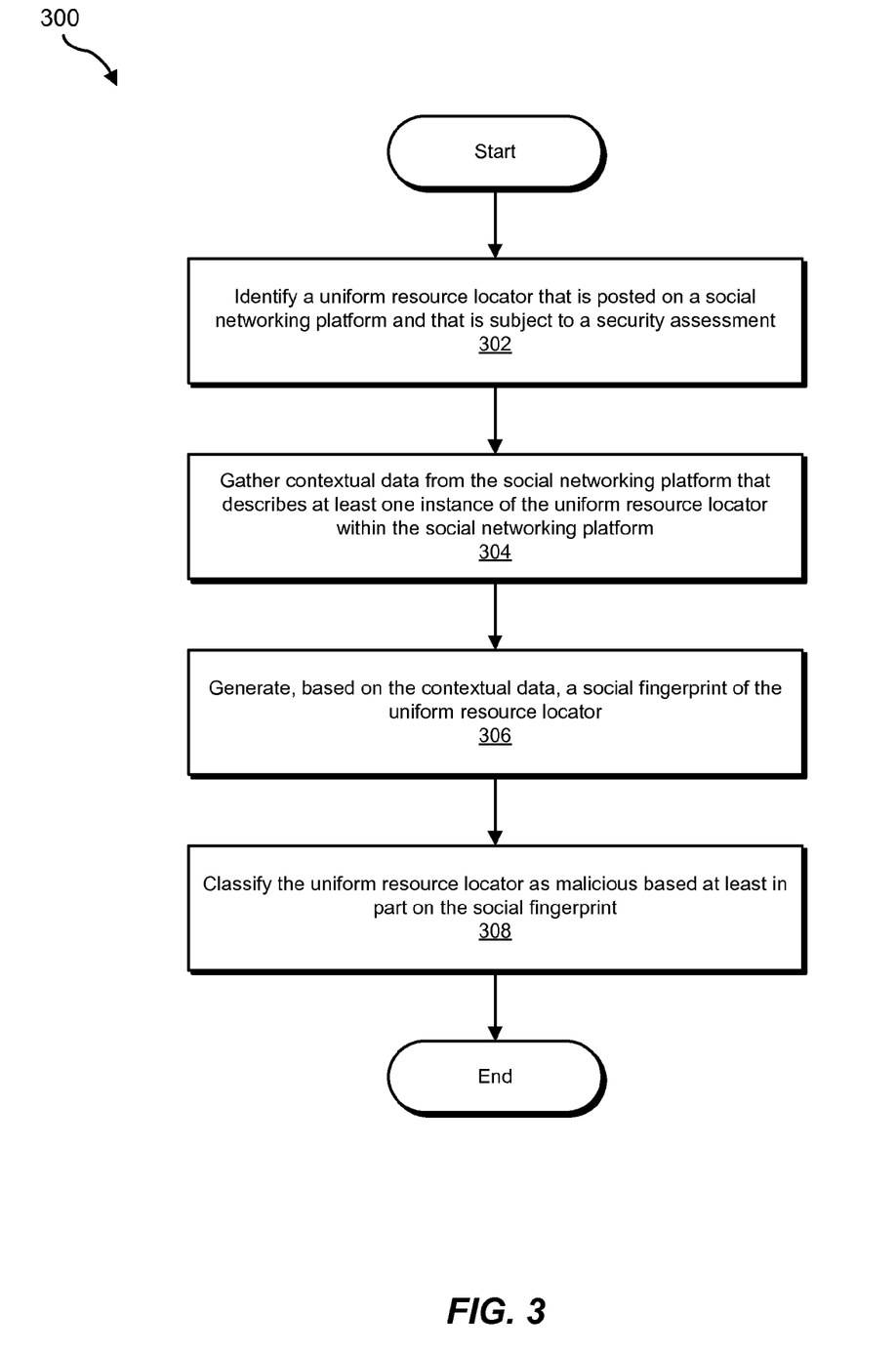
FIG. 3 is a flow diagram of an exemplary method for determining that uniform resource locators are malicious.

FIG. 3 is a flow diagram of an exemplary computer-implemented method 300 for determining that uniform resource locators are malicious. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a uniform resource locator that is posted on a social networking platform and that is subject to a security assessment. For example, at step 302 identification module 104 may, as part of computing device 202 in FIG. 2, identify a uniform resource locator 208 that is posted on social networking platform 206 and that is subject to a security assessment.

For example, the identification module may identify a uniform resource locator similar to "http://foo.bar" in a FACEBOOK comment. The uniform resource locator may be subject to a security assessment because the ".bar" domain may be considered suspicious.

As used herein, the phrase "social networking platform" may refer to any computing device and/or devices, software framework, and/or combination thereof usable for providing and/or hosting a service (e.g., via the Internet). In some examples, the phrase "social networking platform" may refer to a platform that provides a social networking service. As used herein, the phrase "social networking service" may refer to any service and/or Internet site that manages social connections and/or shares, compiles, formats, and/or broadcasts information based on social connections. Examples of social networking platforms may include FACEBOOK, TWITTER, LINKEDIN, REDDIT, and GOOGLE+. In some examples, the online service may host data and/or process the data via cloud-based applications (e.g., web-based email clients, online calendar applications, online picture albums, etc.) for personal and/or private use. Additionally or alternatively, the phrase "social networking service" as used herein may refer to any of a variety of online services that enable users to submit, post, and/or transmit messages and that maintain information about users. For example, the phrase "social networking service" as used herein may refer to online shopping services (e.g., EBAY), online gaming services (e.g., HI5), online entertainment services (e.g., YOUTUBE), etc.

In some examples, identification module 104 may identify the uniform resource locator by following at least one uniform resource locator masking service redirect to a final destination uniform resource locator. For example, the uniform resource locator may appear in the post as "http://bit.ly/13423" but point to a final destination uniform resource locator of "http://www.google.com".

As used herein, the phrase "uniform resource locator masking service" generally refers to any platform which generates a new uniform resource locator that redirects to a user-supplied uniform resource locator. Uniform resource locator masking services may serve to shorten and/or obscure a uniform resource locator. Legitimate users may use uniform resource locator masking services to post a uniform resource locator on a platform with a character limit, while malicious users may use uniform resource locator masking services to cloak the identity of the uniform resource locator and evade automated systems for detecting malicious URLs. Examples of uniform resource locator masking services may include BITLY, GOO.GL, and/or TINYURL.

The security assessment may arise in any suitable context. For example, the uniform resource locator may be subject to the security assessment due to a characteristic of the uniform resource locator. Some examples of a characteristic of the uniform resource locator may include the domain name of the uniform resource locator, the length of the uniform resource locator, and/or keywords present in the uniform resource locator. For example, a uniform resource locator may point to a domain name known to be malicious and the domain name may trigger a security assessment.

In some examples, the security assessment may be performed due to the contextual data from the social networking platform. For example, keywords such as "urgent" or "virus" contained in the same post as the uniform resource locator may indicate a suspicious post and the keywords may trigger a security assessment.

In some examples, the security assessment may be performed due to the account which posted the uniform resource locator. For example, any uniform resource locators contained in posts made by a suspected illegitimate account may be flagged for a security assessment.

In some examples, the security assessment may be performed due to the social networking platform on which the uniform resource locator may be posted. In some embodiments, the social networking platform may be configured to be subject to routine security assessments at specific time intervals. For example, a social networking platform may perform a security assessment every hour of all uniform resource locators posted in the past hour.

Returning to FIG. 3, at step 304 one or more of the systems described herein may gather contextual data from a social networking platform that describes at least one instance of the uniform resource locator within the social networking platform. For example, at step 304 gathering module 106 may, as part of computing device 202 in FIG. 2, gather contextual data 210 from social networking platform 206 that describes at least one instance of uniform resource locator 208 within the social networking platform 206.

For example, gathering module 106 may find the text "urgent virus check, make sure your PC is safe" in the FACEBOOK comment containing the uniform resource locator "http://foo.bar". In this example, gathering module 106 may identify that the text contains the keywords "urgent" and "virus."

In some examples, gathering module 106 may gather the contextual data that describes at least one instance of the uniform resource locator within the social networking platform by gathering a first set of contextual data that describes a first instance of the uniform resource locator within the social networking platform and gathering a second set of contextual data that describes a second instance of the uniform resource locator within the social networking platform, the second instance of the uniform resource locator including a masked uniform resource locator that redirects to the uniform resource locator.

Figure 4:
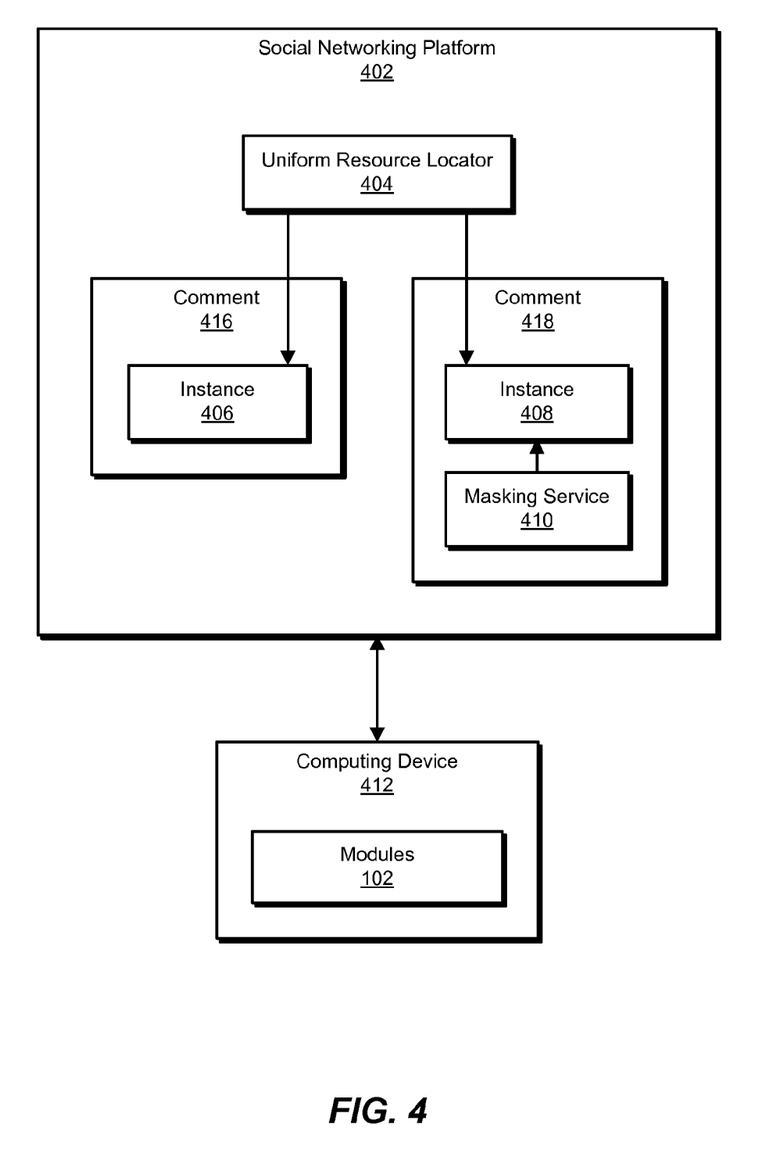
FIG. 4 is a block diagram of an exemplary system for determining that uniform resource locators are malicious.

FIG. 4 illustrates an exemplary system 400 for determining whether URLs are malicious. As shown in FIG. 4, exemplary system 400 may include a social networking platform 402 in communication with a computing device 412. Using FIG. 4 as an example, uniform resource locator 404 may be posted to social networking platform 402 in at least two comments, a comment 416 and a comment 418. Comment 416 may include an instance 406 of uniform resource locator 404, and/or comment 418 may include an instance 408 of uniform resource locator 404. Instance 408 may be masked using a uniform resource locator masking service 410.

In one example, uniform resource locator 404 may represent "http://reallybadmalware.com". Instance 406 may not be masked and may therefore appear in comment 416 as "http://reallybadmalware.com". Instance 408 may be masked with BITLY and may appear in comment 416 as "http://bit.ly/4jk31". Modules 102 may identify instance 406 and instance 408 as instances of the same uniform resource locator, "http://reallybadmalware.com", even though instance 406 and instance 408 may appear to be different uniform resource locators due to the use of masking service 410.

In some examples, the contextual data may include a uniform resource locator masking service used on the uniform resource locator. The uniform resource locator masking service used on the uniform resource locator may indicate that the uniform resource locator may be malicious. For example, if a specific uniform resource locator masking service is known to be used primarily by malicious entities, use of that specific uniform resource locator masking service may indicate a malicious uniform resource locator. Use of multiple uniform resource locator masking services may also indicate a malicious uniform resource locator, as legitimate users may seldom use more than one uniform resource locator masking service on a single uniform resource locator.

In some examples, the contextual data may include a social media indicator attached to the post containing the uniform resource locator. Examples of a social media indicator may include GOOGLE +1, FACEBOOK LIKE, FACEBOOK SHARE, tags, and/or comments. A post containing a malicious uniform resource locator may have +1s and/or Likes from known bot accounts, and/or the post may no +1s and/or Likes from legitimate users. A post containing a malicious uniform resource locator may be associated with comments by users indicating that the uniform resource locator may be known to be malicious, for example, "this is a scam, don't click this."

In some examples, the contextual data may include a keyword in the post containing the uniform resource locator. Examples of a keyword may include words like "warning" and "virus," which may indicate alarm, and/or "sale" and "now" which may indicate urgency. Malicious uniform resource locators may be more likely to be associated with alarming and/or urgent text. For example, a uniform resource locator preceded by the text, "Warning! New computer virus is spreading quickly, check your computer for the virus by clicking here!" may be malicious.

In some examples, the contextual data may include a language in the post containing the uniform resource locator. Examples of languages may include any written language (e.g., English, French, German, Farsi, etc.). Uniform resource locators contained in posts that use a language different than the primary language of the page may be more likely to be malicious. For example, a uniform resource locator in a comment written in German posted to a primarily English page may be malicious.

In some examples the contextual data may include a timestamp of a post containing the uniform resource locator. The timestamp of a post containing the uniform resource locator may indicate maliciousness if it occurs suspiciously close in time to other posts by that user, indicating that the user may be a bot, or if it matches the timestamp of similar posts known to contain malicious uniform resource locators.

In some examples, the contextual data may include an age of a thread containing the uniform resource locator. For example, the original comment containing the uniform resource locator may have been posted at 12:00 AM GMT on Jan. 1, 2013. There may be seven comments in the thread, and the newest comment may have been posted at 12:05 AM GMT on Jan. 1, 2013. The short age of the thread may indicate that the comments were all posted by bot accounts, which may indicate that the uniform resource locator may be malicious.

Returning to FIG. 3, at step 306 one or more of the systems described herein may generate, based on the contextual data, a social fingerprint of the uniform resource locator. For example, at step 306 generation module 108 may, as part of computing device 202 in FIG. 2, generate, based on contextual data 210, a social fingerprint 212 of uniform resource locator 208.

Generation module 108 may generate the social fingerprint in any suitable format. For example, generation module 108 may generate the social fingerprint "domain:bar; keywords:urgent,virus,check" for the uniform resource locator "http://foo.bar" based on the domain and the keywords "urgent virus check" in the comment. In some embodiments, the social fingerprint may include a hashmap of the contextual data. For example, "domain:ly; post-language:french; page-language:english; comments:3", "domain-name:malwaresite; url-masks:2; url-mask-list:bitly,tinyurl", and/or "domain:com; keywords:virus,scan,urgent,now; total-comments:5; bot-comments:3; timestamp:1357065788". In some examples, generation module 108 may generate the social fingerprint by generating a vector of contextual characteristics of the uniform resource locator that is suitable as input for a machine learning system.

Returning to FIG. 3, at step 308 one or more of the systems described herein may classify the uniform resource locator as malicious based at least in part on the social fingerprint. For example, at step 308 classifying module 110 may, as part of computing device 202 in FIG. 2, classify uniform resource locator 208 as malicious based at least in part on social fingerprint 212.

Classifying module 110 may classify the uniform resource locator as malicious based on any of a variety of criteria. For example, classifying module 110 may classify "http://foo.bar" as malicious because the social fingerprint "domain:bar; keywords:urgent,virus,check" may be known to be associated with malicious uniform resource locators.

In some embodiments, one or more of the systems described herein may also (1) identify a plurality of uniform resource locators that may be posted on a social networking platform and that may be subject to a security assessment, (2) gather a plurality of contextual data from the social networking platform that may describe a plurality of instances of the plurality of uniform resource locators within the social networking platform, (3) generate, based on the plurality of contextual data, a plurality of social fingerprints of the plurality of uniform resource locators, and (4) generate, based on the plurality of social fingerprints, a social fingerprint classifier. In these examples, classifying module 110 may classify the uniform resource locator as malicious by using the social fingerprint classifier.

For example, identification module 104 may identify two hundred uniform resource locators posted to FACEBOOK. Gathering module 106 may gather contextual data about instances of the two hundred uniform resource locators and generation module 108 may generate a total of ninety social fingerprints from the two hundred uniform resource locators. These ninety social fingerprints, together with determinations on whether or not the uniform resource locators the social fingerprints represent are malicious, may include a ground truth set which may then be used to generate a social fingerprint classifier. The social fingerprint classifier may include and/or may be included and/or used by classifying module 110.

As used herein, the phrase "ground truth set" generally represents the training data set for a machine learning system. For example, the ground truth set may be a set of several hundred social fingerprints associated with uniform resource locators that may be known to be malicious, and/or a set of several hundred social fingerprints associated with uniform resource locators that may be known to not be malicious.

As used herein, the phrase "machine learning" may refer to any technique for computer-enabled empirical assessments. For example, the phrase "machine learning" may refer to one or more supervised learning techniques for analyzing future inputs based on an analysis of training data. As used herein, the term "classifier" may refer to any algorithm, formula, rule, module, and/or filter for classifying, labeling, categorizing, rating, and/or scoring an input. Accordingly, the phrase "machine learning classifier" may refer to any classifier generated, defined, and/or configured at least in part by a machine learning technique.

In some embodiments, classifying module 110 may include a manual rules engine developed by domain experts. In some examples, domain experts may manually input contextual traits determined to indicate maliciousness or non-malicious and/or may manually input rules for determining the maliciousness of uniform resource locators based on social fingerprints.

In some embodiments, one or more of the systems described herein may also perform a security action based on the indication that the uniform resource locator is malicious. Some examples of a security action may include flagging the post containing the malicious uniform resource locator for manual review, removing the post containing the malicious uniform resource locator, adding a warning to the post containing the malicious uniform resource locator, inserting an interstitial warning page when the malicious uniform resource locator is clicked, flagging the account that posted the malicious uniform resource locator, and/or alerting a user that a malicious uniform resource locator has been found during the security assessment.

The phrase "malicious uniform resource locator," as used herein, generally refers to any uniform resource locator pointing toward content that may be considered harmful to a user or a system. Some examples may including malware hosts, phishing sites, and/or scam sites.

Figure 5:
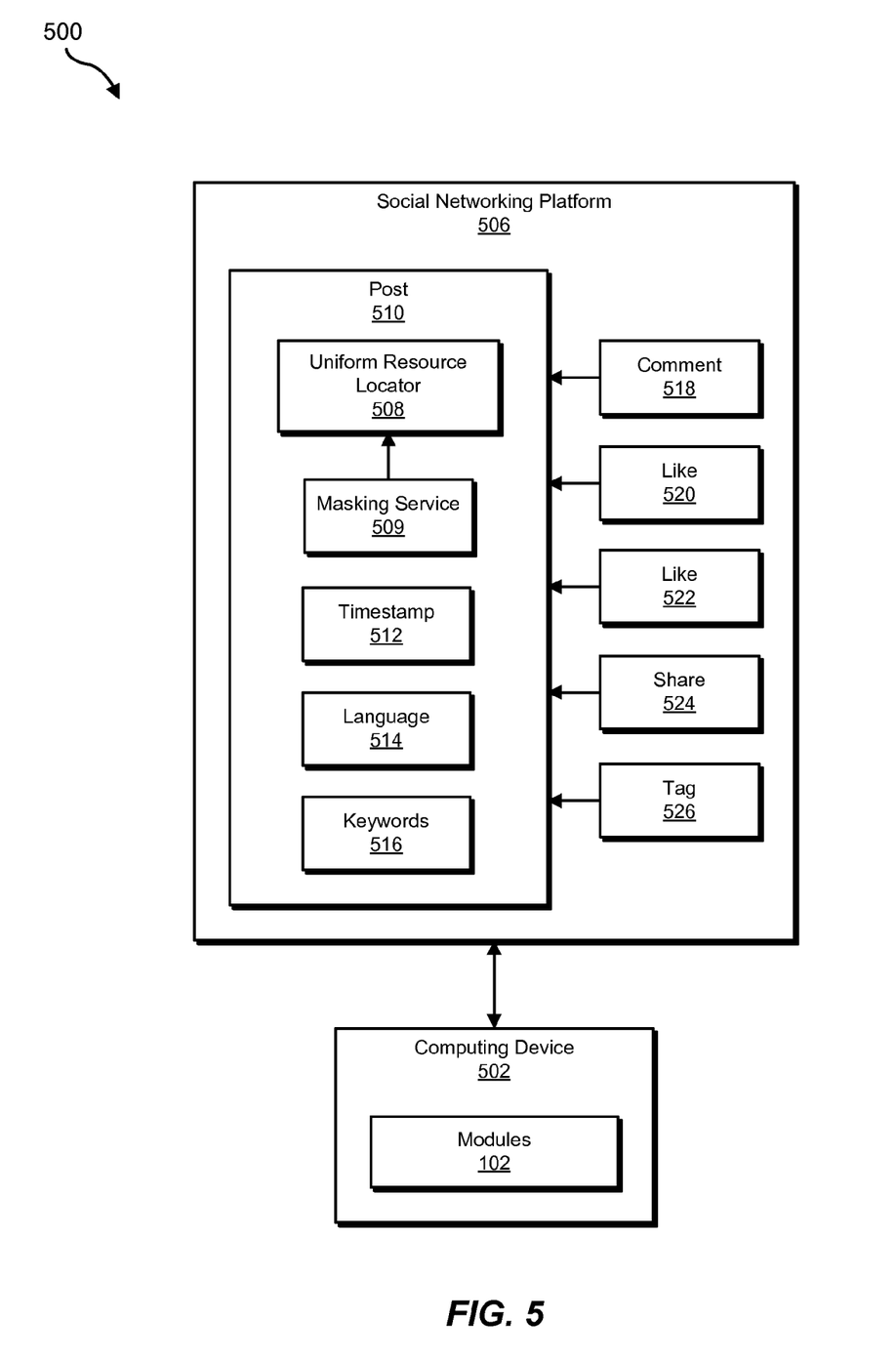
FIG. 5 is a block diagram of an exemplary system for determining that uniform resource locators are malicious.

FIG. 5 is a block diagram of an exemplary system 500 for determining that URLs are malicious. As shown in FIG. 5, exemplary system 500 may include a social networking platform 506 in communication with a computing device 502. In some examples, a post 510 on social networking platform 506 may contain a uniform resource locator 508, which may be masked using a masking service 509. Post 510 may have a timestamp 512, be written in a language 514, and/or contain keywords 516. There may be a comment 518 on post 510. There may also be a like 520 and/or a like 522 on comment 510. Comment 510 may be shared via a share 524. Comment 510 may be tagged with a tag 526.

In some examples, uniform resource locator 508 may be malicious. This may be indicated by the contextual data surrounding comment 510. For example, masking service 509 may be a suspicious masking service known to be used by malware creators. Timestamp 512 may be identical to timestamps on a plurality of comments known to contain malicious uniform resource locators. Language 514 may not be the primary language used on the page on which the comment is posted. Keywords 516 may also be suspicious keywords such as "free," "cash," and/or "now." Comment 518 may be a comment from a legitimate user containing key phrases such as "this is a scam," or it may be a comment from a known bot account. Like 520 and/or like 522 may originate from known bot accounts. Share 524 may also originate from a known bot account. Comments, likes, and shares originating from bot accounts are suspicious because malware creators may create bots to add social indicators to malicious content in order to make the malicious content appear more socially trusted. Tag 526 may be a tag in a suspicious category such as "financial advice" or "virus warning." Any or all of this contextual data may indicate that uniform resource locator 508 may be subject to a security assessment by modules 102 on computing device 502.

As explained above in connection with method 300 in FIG. 3, a computing device may identify a uniform resource locator posted to a social networking platform that may be subject to a security assessment. The uniform resource locator may be cloaked by means of a uniform resource locator masking service. The masking service used, if any, may be one of many pieces of contextual data that the computing device may gather about the uniform resource locator.

The computing device may use the contextual data to generate a social fingerprint representing the uniform resource locator. A machine learning system may be applied to the social fingerprint in order to classify the uniform resource locator the social fingerprint represents as malicious. A security module may then flag the post containing the malicious uniform resource locator, alert a user to the malicious uniform resource locator, and/or perform other security actions in order to prevent the malicious uniform resource locator from harming users.

Figure 6:
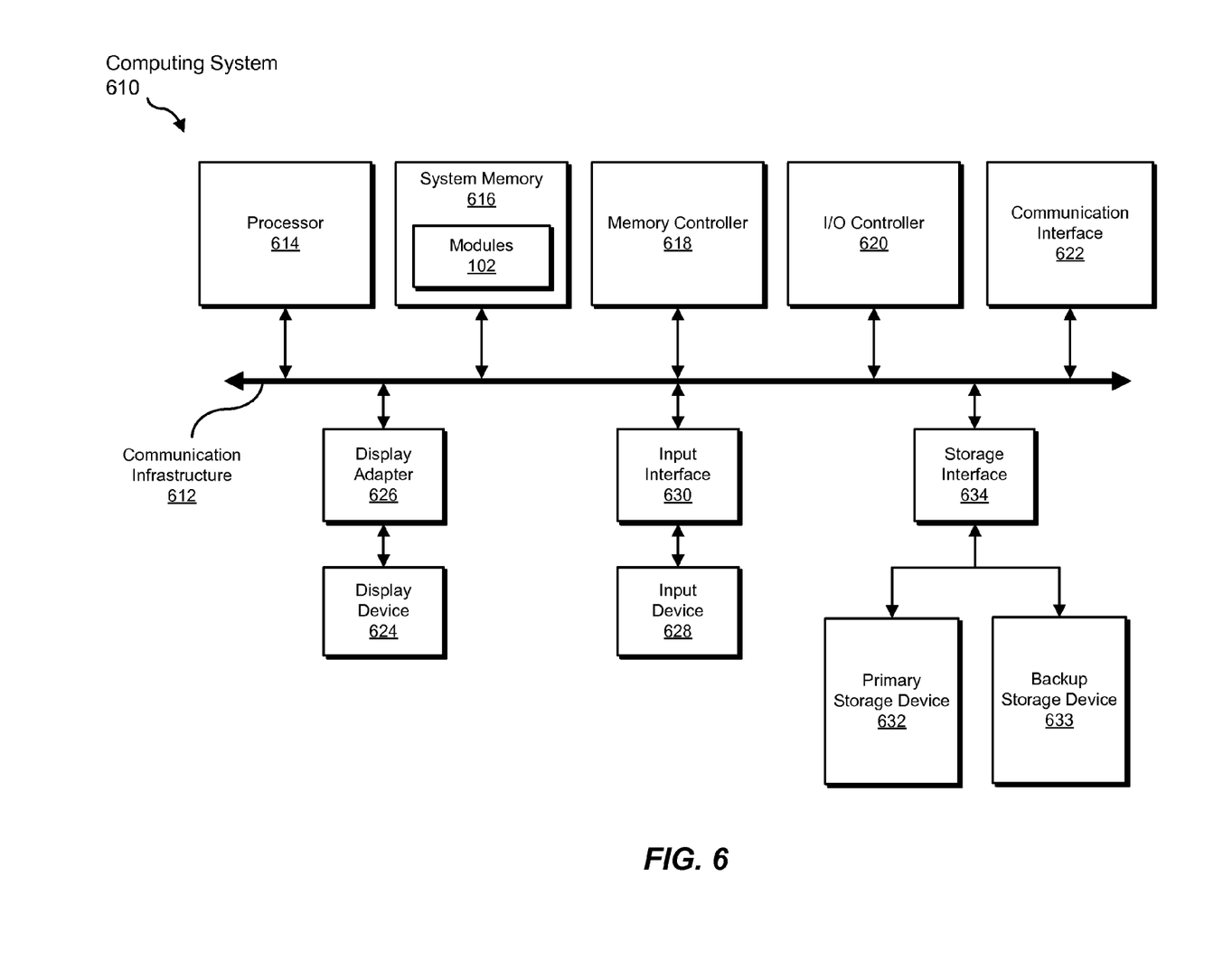
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, gathering, generating and/or classifying steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
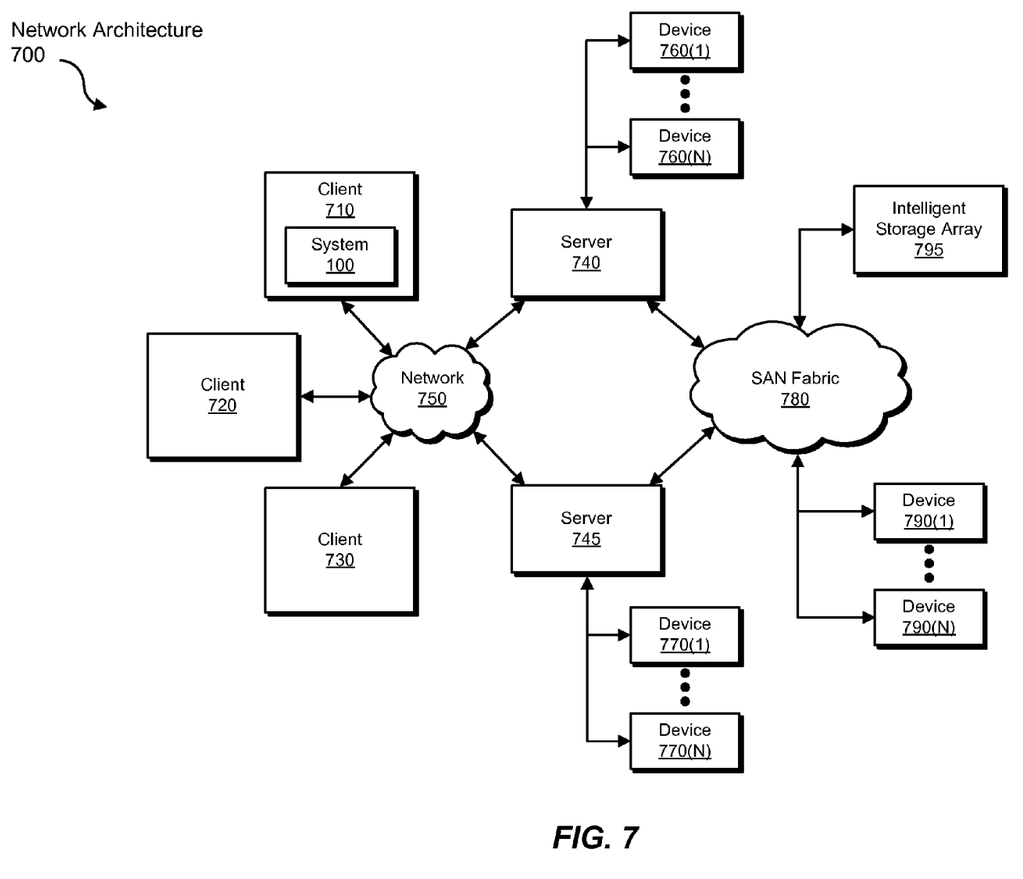
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, gathering, generating and/or classifying steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining that uniform resource locators are malicious.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive social networking data to be transformed, transform the social networking data into data relevant to maliciousness determinations for one or more uniform resource locators, output a result of the transformation to a social fingerprint, use the result of the transformation to determine that the uniform resource locator is malicious, and store the result of the transformation to a security database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining that uniform resource locators are malicious, the method being performed by a computing device comprising at least one processor, the method comprising:
   identifying a plurality of uniform resource locators that are posted on a social networking platform;
   gathering contextual data from the social networking platform that describes a plurality of instances of the plurality of uniform resource locators within the social networking platform, the contextual data comprising a number of multiple resource locator masking services used by an instance of a uniform resource locator within the plurality of instances of the plurality of uniform resource locators;
   generating, based on the contextual data, a plurality of social fingerprints of the plurality of uniform resource locators;
   determining whether some or all of the uniform resource locators within the plurality of uniform resource locators associated with the plurality of social fingerprints are malicious by determining that some or all of the uniform resource locators within the plurality of uniform resource locators that use above a certain number of multiple resource locator masking services are malicious;
   generating, based at least in part on the plurality of social fingerprints and the determination, a ground truth set comprising training data for a machine learning system;
   generating, based at least in part on the ground truth set, a social fingerprint classifier that classifies uniform resource locators that use above the certain number of multiple resource locator masking services as malicious;
   identifying at least one additional uniform resource locator that is posted on the social networking platform and that is subject to a security assessment;
   classifying the additional uniform resource locator as malicious using the social fingerprint classifier.

2. The computer-implemented method of claim 1, further comprising performing a security action based on the indication that the additional uniform resource locator is malicious.

3. The computer-implemented method of claim 2, wherein:
   identifying the additional uniform resource locator that is posted on the social networking platform comprises identifying a post containing the additional uniform resource locator;
   the security action comprises at least one of:
      flagging the post for manual review;

removing the post;
adding a warning to the post;
inserting an interstitial warning page when the additional uniform resource locator is clicked;
flagging an account that posted the additional resource locator.

4. The computer-implemented method of claim 1, wherein gathering the contextual data that describes the plurality of instances of the plurality of uniform resource locators comprises:
gathering a first set of contextual data that describes a first instance of one or more uniform resource locators from within the plurality of uniform resource locators;
gathering a second set of contextual data that describes a second instance of the one or more uniform resource locators from within the plurality of uniform resource locators, the second instance of the one or more uniform resource locators from within the plurality of uniform resource locators comprising a masked uniform resource locator that redirects to the uniform resource locator.

5. The computer-implemented method of claim 1, wherein the social networking platform comprises at least one of:
an online shopping service;
an online gaming service;
an online entertainment service.

6. The computer-implemented method of claim 1, wherein the contextual data further comprises at least one of:
a social media indicator attached to a post comprising an instance of a uniform resource locator within the plurality of instances of the plurality of uniform resource locators;
a keyword in a post comprising an instance of a uniform resource locator within the plurality of instances of the plurality of uniform resource locators;
a language in a post comprising an instance of a uniform resource locator within the plurality of instances of the plurality of uniform resource locators;
a timestamp of a post comprising an instance of a uniform resource locator within the plurality of instances of the plurality of uniform resource locators.

7. The computer-implemented method of claim 1, wherein generating the social fingerprint comprises generating a vector of the contextual data that is suitable as input for the machine learning system.

8. The computer-implemented method of claim 1, wherein the contextual data further comprises an age of a thread comprising an instance of a uniform resource locator within the plurality of instances of the plurality of uniform resource locators.

9. The computer-implemented method of claim 1, wherein each social fingerprint within the plurality of social fingerprints comprises a hashmap of the contextual data.

10. The computer-implemented method of claim 1, wherein the ground truth set comprises at least one of:
a set of social fingerprints associated with uniform resource locators that are known to be malicious;
a set of social fingerprints associated with uniform resource locators that are known to not be malicious.

11. A system for determining that uniform resource locators are malicious, the system comprising:
an identification module programmed to identify a plurality of uniform resource locators that are posted on a social networking platform;
a gathering module programmed to gather contextual data from the social networking platform that describes a plurality of instances of the plurality of uniform resource locators within the social networking platform, the contextual data comprising a number of multiple resource locator masking services used by an instance of a uniform resource locator within the plurality of instances of the plurality of uniform resource locators;
a generation module programmed to:
generate, based on the contextual data, a plurality of social fingerprints of the plurality of uniform resource locators;
determine whether some or all of the uniform resource locators within the plurality of uniform resource locators associated with the plurality of social fingerprints are malicious by determining that some or all of the uniform resource locators within the plurality of uniform resource locators that use above a certain number of multiple resource locator masking services are malicious;
generate, based at least in part on the plurality of social fingerprints and the determination, a ground truth set comprising training data for a machine learning system;
generate, based at least in part on the ground truth set, a social fingerprint classifier that classifies uniform resource locators that use above the certain number of multiple resource locator masking services as malicious;
a classifying module programmed to:
identify at least one additional uniform resource locator that is posted on the social networking platform and that is subject to a security assessment;
classify the additional uniform resource locator as malicious using the social fingerprint classifier;
at least one processor configured to execute the identification module, the gathering module, the generation module and the classifying module.

12. The system of claim 11, further comprising a security module programmed to perform a security action based on the indication that the additional uniform resource locator is malicious.

13. The system of claim 12, wherein:
the classification module is programmed to identify the additional uniform resource locator that is posted on the social networking platform by identifying a post containing the additional uniform resource locator;
the security module is programmed to perform the security action by at least one of:
flagging the post for manual review;
removing the post;
adding a warning to the post;
inserting an interstitial warning page when the additional uniform resource locator is clicked;
flagging an account that posted the additional resource locator.

14. The system of claim 11, wherein the gathering module is programmed to gather the contextual data that describes the plurality of instances of the plurality of uniform resource locators by:
gathering a first set of contextual data that describes a first instance of one or more uniform resource locators from within the plurality of uniform resource locators;
gathering a second set of contextual data that describes a second instance of the one or more uniform resource locators from within the plurality of uniform resource locators, the second instance of the one or more uniform resource locators from within the plurality of uniform resource locators comprising a masked uniform resource locator that redirects to the uniform resource locator.

15. The system of claim 11, wherein the social networking platform comprises at least one of:
an online shopping service;
an online gaming service;
an online entertainment service.

16. The system of claim 11, wherein the contextual data further comprises a social media indicator attached to a post comprising an instance of a uniform resource locator within the plurality of instances of the plurality of uniform resource locators.

17. The system of claim 11, wherein the contextual data further comprises a keyword in a post comprising an instance of a uniform resource locator within the plurality of instances of the plurality of uniform resource locators.

18. The system of claim 11, wherein the contextual data further comprises a language in a post comprising an instance of a uniform resource locator within the plurality of instances of the plurality of uniform resource locators.

19. The system of claim 11, wherein the contextual data further comprises a timestamp of a post comprising an instance of a uniform resource locator within the plurality of instances of the plurality of uniform resource locators.

20. A non-transitory computer-readable-storage medium comprising one or more computer-readable instructions that, when executed by at least one processor of a computing device, cause the computing device to:
identify a plurality of uniform resource locators that are posted on a social networking platform;
gather contextual data from the social networking platform that describes a plurality of instances of the plurality of uniform resource locators within the social networking platform, the contextual data comprising a number of multiple resource locator masking services used by an instance of a uniform resource locator within the plurality of instances of the plurality of uniform resource locators;
generate, based on the contextual data, a plurality of social fingerprints of the plurality of uniform resource locators;
determine whether some or all of the uniform resource locators within the plurality of uniform resource locators associated with the plurality of social fingerprints are malicious by determining that some or all of the uniform resource locators within the plurality of uniform resource locators that use above a certain number of multiple resource locator masking services are malicious;
generate, based at least in part on the plurality of social fingerprints and the determination, a ground truth set comprising training data for a machine learning system;
generate, based at least in part on the ground truth set, a social fingerprint classifier that classifies uniform resource locators that use above the certain number of multiple resource locator masking services as malicious;
identify at least one additional uniform resource locator that is posted on the social networking platform and that is subject to a security assessment;
classify the additional uniform resource locator as malicious using the social fingerprint classifier.

* * * * *